United States Patent
Drepper

(10) Patent No.: US 11,960,898 B2
(45) Date of Patent: Apr. 16, 2024

(54) ENABLING ASYNCHRONOUS OPERATIONS IN SYNCHRONOUS PROCESSORS

(71) Applicant: RED HAT, INC., Raleigh, NC (US)

(72) Inventor: Ulrich Drepper, Grasbrumn (DE)

(73) Assignee: Red Hat, Inc., Raleigh, NC (US)

( * ) Notice: Subject to any disclaimer, the term of this patent is extended or adjusted under 35 U.S.C. 154(b) by 705 days.

(21) Appl. No.: 17/127,776

(22) Filed: Dec. 18, 2020

(65) Prior Publication Data
US 2022/0197718 A1    Jun. 23, 2022

(51) Int. Cl.
*G06F 9/38* (2018.01)
*G06F 1/12* (2006.01)
*G06F 9/52* (2006.01)

(52) U.S. Cl.
CPC .............. *G06F 9/3871* (2013.01); *G06F 1/12* (2013.01); *G06F 9/3826* (2013.01); *G06F 9/3869* (2013.01); *G06F 9/3877* (2013.01); *G06F 9/52* (2013.01); *G06F 9/522* (2013.01)

(58) Field of Classification Search
None
See application file for complete search history.

(56) References Cited

U.S. PATENT DOCUMENTS

| | | |
|---|---|---|
| 6,848,060 B2 | 1/2005 | Cook et al. |
| 6,882,695 B1 | 4/2005 | Kameda et al. |
| 6,925,549 B2 | 8/2005 | Cook et al. |
| 7,058,793 B1 | 6/2006 | Hartnett et al. |
| 9,928,074 B2 | 3/2018 | Ge et al. |
| 10,374,981 B1 * | 8/2019 | Nicol .................. H04L 47/6245 |
| 2009/0063821 A1 | 3/2009 | Nakajima |

OTHER PUBLICATIONS

Anoop Iyer et al., "Power and Performance Evaluation of Globally Asynchronous Locally Synchronous Processors", Computer Society, http://course.ece.cmu.edu/~ece743/project/01003573.pdf, Electrical and Computer Engineering Department, Carnegie Mellon University, May 2002, 11 pages.

* cited by examiner

*Primary Examiner* — Qing Yuan Wu
(74) *Attorney, Agent, or Firm* — Womble Bond Dickinson (US) LLP

(57) ABSTRACT

The technology disclosed herein enables a processor that processes instructions synchronously in accordance with a processor clock to identify a first instruction specifying an asynchronous operation to be processed independently of the processor clock. The asynchronous operation is performed by an asynchronous execution unit that executes the asynchronous operation independently of the processor clock and generates at least one result of the asynchronous operation. A synchronous execution unit executes, in parallel with the execution of the asynchronous operation by the asynchronous execution unit, one or more second instructions specifying respective synchronous operations. Responsive to determining that the asynchronous execution unit has generated the at least one result of the asynchronous operation, the processor receives the at least one result of the asynchronous operation.

18 Claims, 7 Drawing Sheets

```
┌─────────────────────────────────────────────────────────────┐
│ Identify, by a processor that processes instructions        │
│ synchronously in accordance with a processor clock, a       │
│ first instruction specifying an asynchronous operation to   │
│ be processed independently of the processor clock           │
│                           510                               │
└─────────────────────────────────────────────────────────────┘
                              │
                              ▼
┌─────────────────────────────────────────────────────────────┐
│ Identify, by an asynchronous execution unit that receives   │
│ the asynchronous operation, an address of a result memory   │
│ location, wherein the address corresponds to an operand     │
│ of the asynchronous operation                               │
│                           520                               │
└─────────────────────────────────────────────────────────────┘
                              │
                              ▼
┌─────────────────────────────────────────────────────────────┐
│ Perform the asynchronous operation by the asynchronous      │
│ execution unit that executes the asynchronous operation     │
│ independently of the processor clock and generates at       │
│ least one result of the asynchronous operation              │
│                           530                               │
└─────────────────────────────────────────────────────────────┘
                              │
                              ▼
┌─────────────────────────────────────────────────────────────┐
│ Enqueue, by the asynchronous execution unit, a queue entry  │
│ containing the address of the result memory location in a   │
│ result queue, and notify the processor that a result has    │
│ been added to the result queue                              │
│                           540                               │
└─────────────────────────────────────────────────────────────┘
                              │
                              ▼
┌─────────────────────────────────────────────────────────────┐
│ Responsive to the notification that the result has been     │
│ added to the result queue, dequeue the queue entry and      │
│ provide the address of the result memory location to an     │
│ interrupt handler associated with the instruction           │
│                           550                               │
└─────────────────────────────────────────────────────────────┘
```

FIG. 5

ENABLING ASYNCHRONOUS OPERATIONS IN SYNCHRONOUS PROCESSORS

TECHNICAL FIELD

The present disclosure is generally related to computer architectures, and more particularly, to enabling synchronous processors to perform asynchronous operations.

BACKGROUND

Source code that implements a computer application may be translated by a compiler from a high level language into lower-level code that is more suitable for execution by hardware such as a Central Processing Unit (CPU) of a computer system. The lower-level code can include, for example, e.g., processor instructions, hardware description language code, and so on. Assembler code generated by compilers is ordinarily limited to the instruction set of the CPU on which the code is targeted to be executed.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 4 and 5 depict flow diagrams of example methods for performing asynchronous operations on an asynchronous execution unit in parallel with synchronous operations performed on a synchronous execution unit, in accordance with one or more aspects of the present disclosure;

DETAILED DESCRIPTION

Figure 1:
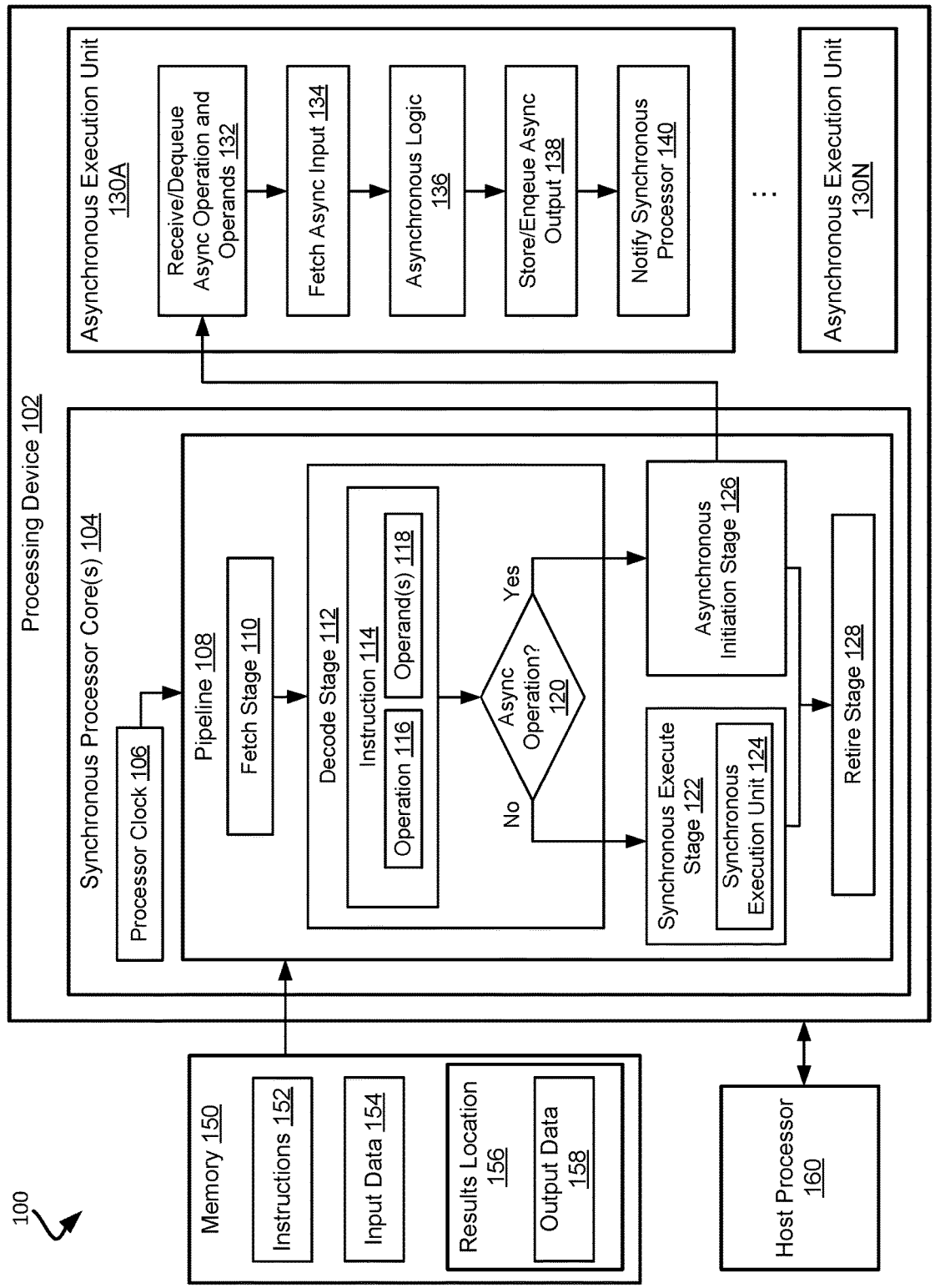
FIG. 1 depicts a high-level block diagram of an example computing device having a pipeline that can execute synchronous operations and initiate execution of asynchronous operations on an asynchronous execution unit, in accordance with one or more aspects of the present disclosure.

The speed of the CPU can be limited by a clock frequency that determines the rate at which the CPU executes code instructions. The CPU can include a pipelined execution unit, which can execute each instruction in a sequence of stages. The stages can be, for example, fetch, decode, execute, and retire stages, each of which can be performed in a clock cycle. Although each instruction may take several cycles to execute, e.g., four cycles, corresponding to the four stages, each stage of the pipeline can operate on a different instruction in the same clock cycle. Thus, the pipeline can, when full, execute instructions at a rate of one instruction per clock cycle, but the CPU clock frequency is limited by the latency of the longest-running (e.g., slowest) pipeline stage. Thus, in synchronous circuits, it is not generally possible to increase the clock frequency beyond the inverse of the worst-case latency of the slowest pipeline stage. To speed up the pipeline stages, longer or slower stages can be split into multiple stages and/or specialized in their functionality. As a result, some portions of the CPU, such as the faster pipeline stages, are not used in each clock cycle. By adding specialized pipeline stages, the overall utilization of the CPU is reduced, because only one or a few of the specialized stages are concurrently used.

Aspects of the present disclosure address the above-noted and other deficiencies by providing technology that can perform particular operations in a computing device using asynchronous execution units, which can use asynchronous logic that is not synchronized to a clock. Asynchronous execution units thus can produce results substantially faster than the synchronous logic used in the implementation of the pipeline stages of a traditional processor. The computing device can include a processing device, and the processing device can include one or more synchronous processor cores and one or more asynchronous execution units. The asynchronous execution units can perform particular operations, which can be performance-sensitive or computationally-intensive operations, such as matrix multiplication, at the request of the synchronous processor cores. Each synchronous processor core can include one or more synchronous execution units. Each synchronous execution unit can execute processor instructions according to a synchronous clock.

At least one of the processor instructions can specify an asynchronous operation and one or more operands. A processor instruction can specify a particular asynchronous operation in an opcode portion of the instruction, for example, in which case a single processor instruction can specify a particular asynchronous operation. Alternatively, a sequence of one or more processor instructions can specify a particular asynchronous operation in other ways, e.g., by storing an identifier or numeric code that identifies the instruction in a memory location or register. For example, an asynchronous matrix multiplication operation can be specified by a processor instruction named "matmul". Instructions that specify asynchronous operations, e.g., the matmul instruction, can be added to a processor's instruction set using dynamic instruction generation techniques.

The processor can send the asynchronous operation and associated operands to the asynchronous execution unit (e.g., by sending the instruction that specifies the asynchronous operation and its operands, or by sending the asynchronous operation and its operands from the instruction, but not other portions of the instruction). The processor can send the asynchronous operation and operands by, for example, making an identifier that represents the operation and the values of the operands, available to inputs of an asynchronous execution unit. The operands can include a results memory address, and the asynchronous execution unit can store results of executing the asynchronous operation at the results memory address. An asynchronous execution unit can include asynchronous logic that can perform multiple different asynchronous operations. The asynchronous execution unit can identify particular asynchronous logic (e.g., a particular circuit) that can perform the asynchronous operation specified by the processor, and provide the operand values to the identified asynchronous logic. As another example, each asynchronous execution unit can include asynchronous logic that performs a particular asynchronous operation, and the processor can identify which asynchronous execution unit performs the asynchronous operation specified by an instruction. The processor can then send the asynchronous operation and its operands to the identified asynchronous execution unit.

The asynchronous execution unit can, upon receiving the asynchronous operation, perform the operation using the input determined by the operands. The asynchronous execution unit can generate one or more results and provide the results to the processor. For example, the asynchronous execution unit can store the results in the results memory locations specified by an operand at the invocation of the instruction.

The processor's pipeline can proceed to process the next instruction without waiting for results from the asynchronous execution unit. Thus, the results of an asynchronous operation are not necessarily available when the instruction that sent the asynchronous operation to the asynchronous execution unit has finished being executed by the synchronous execution unit. Instead, prior to accessing the results memory address of an asynchronous operation, programs executing on the synchronous execution unit can verify, using a designated "check for results" instruction, that the asynchronous operation initiated by a previously-executed instruction has completed. Alternatively or additionally, the programs executing on the synchronous execution unit can wait, using a designated "wait for results" instruction, until the asynchronous operation initiated by a previously-executed instruction has completed.

The systems and methods described herein include technical improvements to a computing environment. In particular, aspects of the present disclosure may enhance the performance of a computing system by enabling operations such as compute-intensive tasks to be performed by asynchronous logic. The asynchronous logic can be included in the same processing device as processor cores that perform synchronous tasks, so communication latency between the synchronous and asynchronous logic components can be quite low. The communication latency may correspond to an amount of time needed to send a request from a synchronous processor core to the asynchronous logic, and/or to receive a response at the synchronous processor core from the asynchronous logic. As an example, the asynchronous logic can be part of the same CPU as the processor cores, in which case there is no additional communication latency involved between the synchronous and asynchronous logic. As another example, the asynchronous logic can be separate from the processor core, e.g., similar to a coprocessor, in which case the communication may be via a bus in a single clock cycle. Further, the asynchronous logic can perform compute-intensive operations at high speed and with low latency, because there is no need for the asynchronous logic to synchronize with a clock. As described above, the clock frequency of a synchronous processor core is dependent on the worst-case latency of the slowest pipeline stage, but adding specialized pipeline stages can reduce the overall utilization of the CPU. In contrast, asynchronous logic can perform computations with the lowest latency allowed by the logic gates and propagation delays in an asynchronous logic block without being limited by the worst-case latency of a synchronous processing stage, assuming the result is not expected and referenced before the asynchronous computation finishes. Various aspects of the above referenced methods and systems are described in details herein below by way of examples, rather than by way of limitation.

FIG. 1 depicts a high-level block diagram of an example computing device 100 having a pipeline 108 that can execute synchronous operations and initiate execution of asynchronous operations on an asynchronous execution unit, in accordance with one or more aspects of the present disclosure. The computing device 100 includes a host processor 160. A processing device 102, and a memory 150. The host processor 160 may be, e.g., a central processing unit (CPU) of the computing device 100. The processing device 102 may be, for example, an FPGA, an Application Specific Integrated Circuit (ASIC), or other integrated circuit. The processing device 102 includes one or more synchronous processor cores 104 and one or more asynchronous execution units 130A-130N. The synchronous processor core 104 includes the pipeline 108, which has a sequence of stages, including a fetch stage 110, a decode stage 112, a synchronous execute stage 122, an asynchronous initiation stage 126, and a retire stage 128. Instructions 114 can move through the pipeline 108 at a rate that corresponds to a frequency of a processor clock 106. For example, if the pipeline 108 is full, it can process instructions at a rate of up to one instruction per cycle of the processor clock 106. The asynchronous execution unit 130A includes asynchronous logic 136, which can perform certain operations 116 without necessarily using a clock signal or other form of synchronous execution.

The fetch stage 110 fetches (e.g., retrieves) instructions 152 from the memory 150 and provides the instructions 152 to the decode stage. The decode stage 112 identifies an operation 116 (e.g., an opcode) and one or more operands 118 of each instruction 114. The decode stage 112 determines whether the operation 116 is an asynchronous operation (at decision block 120). For example, asynchronous operations may have a particular bit set to "1" in their opcodes.

As another example, asynchronous operations may be specified by instructions 114 that are dynamically generated and correspond to asynchronous logic 136 of the asynchronous execution unit 130A. A dynamically-generated instruction can correspond to a logic block, such as an asynchronous execution unit that performs asynchronous operations. A processor core can be a softcore processor. "Softcore processor" herein shall refer to an implementation of a processor on hardware such a Field Programmable Gate Array (FPGA). The softcore processor and the asynchronous execution unit can be created in the FPGA from Hardware Description Language (HDL) code by an HDL compiler. The compiler may use a suitable architecture (e.g., RISC-V) for the softcore processor implemented by the softcore processor code that enables extending the instruction set of the softcore processor. In some embodiments, the compiler may generate one or more instructions (application-specific instructions) and add the instructions to the softcore processor code. The instructions may allow the softcore processor code to interact with a logic block generated from the HDL code on the FPGA. Dynamically-generated instructions are described in further detail in U.S. Pat. No. 10,768,916, which is incorporated herein by reference. Further details about dynamically generating instructions of the processor core(s) 104 are also provided below with respect to the description of the host processor 160.

If the decode stage 112 determines that the operation 116 is not an asynchronous operation, then the decode stage 112 provides the operation 116 and operands 118 to the synchronous execute stage 122. The synchronous execute stage 122 includes a synchronous execution unit 124, which performs the operation 116 with the operands 118 if the operation 116 is a synchronous operation. The operation 116 may be any synchronous operation specified by an instruction 114 of the synchronous processor core 104's instruction set, e.g., memory access operations, arithmetic operations, conditional branching operations, and so on. Subsequent to performing the operation 116, the synchronous execute stage 122 can provide the operation 116 and operands 118 to the retire stage. The retire stage can, for example, store results generated by the execute stage 122 in registers or memory 150.

If the decode stage 112 determines that the operation 116 is an asynchronous operation, then the decode stage 112 can provide the operation 116 and operands 118 to the asynchronous initiation stage 126. The asynchronous initiation stage 126 can send the operation 116 and operands 118 to the asynchronous execution unit 130A. For example, the asynchronous initiation stage 126 can send the operation 116 and operands 118 to a "receive/dequeue asynchronous operation" component 132 of the asynchronous execution unit 130A. The "receive/dequeue asynchronous operation" component 132 can receive the asynchronous operation 116 and operands 118 and provide the operation 116 and operands 118 to a fetch asynchronous input stage 134.

Alternatively, the asynchronous initiation stage 126 can enqueue the operation 116 and operands 118 in an operation queue, from which the asynchronous execution units 130 can dequeue and execute the operation 116 and operands 118. In this way, that multiple asynchronous operations 116 can be sent by the pipeline 108 to the asynchronous execution unit 130A without stopping the execution of other instructions until the asynchronous execution units 130A is ready to receive the operations 116. The operation queue may be, for example, a First-In-First-Out (FIFO) or mailbox communication mechanism provided by an FPGA.

Subsequent to sending or enqueuing the operation 116, the asynchronous execution stage 126 finishes, and the retire stage 128 can retire (e.g., store any results of) the instruction 114. The "receive/dequeue asynchronous operation" component 132 can dequeue the asynchronous operation 116 and operands 118 from the operation queue and provide the operation 116 and operands 118 to the fetch asynchronous input stage 134.

If the operands 118 specify any memory addresses, the fetch asynchronous input stage 134 can retrieve input data 154 from the specified memory addresses and provide the input data 154 to the asynchronous logic 136 (e.g., on corresponding inputs of the asynchronous logic's circuit gates or elements). The fetch asynchronous input stage 134 can also retrieve or prepare any other input data associated with the operation 116 and provide the other input data to the asynchronous logic 136.

The asynchronous logic 136 can perform the specified operations 116 using the specified operands 118 and generate asynchronous output. The asynchronous logic 136 can be a digital circuit, e.g., combinational logic or non-timed logic. For example, since the asynchronous logic 136 is not limited by the frequency of the processor clock 106, the asynchronous logic 136 can produce output at a greater rate than the synchronous execution unit 124's maximum rate of, e.g., one instruction (or operation) per cycle of the processor clock 106. The asynchronous output can include values produced by the outputs of gates or other elements of the asynchronous logic 136.

The asynchronous logic 136 can provide the asynchronous output to a store/enqueue asynchronous output component 138, which can store the asynchronous output and optional information associated with the instruction 114 (such as a results memory address associated with or included as an operand 118 of the instruction 114). The store/enqueue asynchronous output component 138 can store the asynchronous output data 158 at a results memory location 156 in memory 150 or a register, and/or in a queue element. The queue element can be in memory 150. The store/enqueue asynchronous output component 138 can enqueue the queue element in a results queue. A component of the synchronous processor core 104 can retrieve the asynchronous output from the results memory location 156 and/or dequeue the queue element from the results queue. The enqueue operation, or a "notify synchronous processor" component 140, can generate a notification that causes execution of instructions on the synchronous processor core 104 (e.g., an interrupt handler or the like). The executed instructions can retrieve the results (e.g., from the results queue), and provide the results and the optional information associated with the instruction 114 (such as the results memory address associated with or included as an operand 118 of the instruction 114) to the instructions executed on the synchronous processor core (e.g., as parameters to an interrupt handler).

The results queue may be, for example, a FIFO or mailbox communication mechanism provided by the FPGA. The processor or application program may detect the notification and receive the corresponding results, e.g., by de-queuing the results from the result queue. In the case of a mailbox, for example, the processor or application program may receive an interrupt, which may cause an interrupt handler to execute. Information associated with the particular instruction to which the result corresponds can be provided to the processor or application. For example, a memory address provided by the processor or application when the instruction was invoked, such as the results memory address, can be provided to the interrupt handler. The processor may provide the results to an application program by storing the results at the results memory address, which can be determined by the application program and provided as an operand to the instruction. Alternatively, the results memory address can be determined by the asynchronous execution unit and provided to the processor, which can provide the results memory address to the application program. As an alternative to sending the notification, the asynchronous execution unit can store the results in the results memory location, and the processor (e.g., the application program) can use an instruction to test for completion of the asynchronous operation. As another alternative, the processor (e.g., the application program) can use an instruction to wait for completion of the asynchronous operation. The wait instruction can wait until the interrupt for the mailbox corresponding to the asynchronous operation has been received, e.g., an interrupt handler associated with the instruction to which the result corresponds.

In particular embodiments, support for dynamically-generated instructions may be provided by computing device 100. The host processor 160, or a processor of another computing device (not shown), may execute an OS kernel, a compiler, a softcore assembler, and an HDL compiler to generate instructions to be added to an instruction set of synchronous processor core(s) 104, and also to generate logic blocks of the asynchronous execution unit(s) 130. Memory 150 may store a host operating system (OS) including the OS kernel, compiler, softcore assembler, and HDL compiler. The OS may include any suitable type of operating system (e.g., Linux®, Windows®, MacOS®, etc.) that is capable of managing the memory and processes, and software and hardware of the computing device 100. The OS may control the tasks performed by the computing device 100 and manage system resources. For example, the OS kernel may enable access to the asynchronous execution unit(s) 130, to send and receive data, perform operations, execute instructions, and so forth.

The compiler may be implemented in computer instructions stored on the memory 150 and executed by the host processor 160. The compiler may receive source code written in a first form (e.g., C, C++, Fortran) for a computer application and compile it into code in a second form (e.g., binary code, assembly language code, HDL code, etc.) that is different than the first form.

The compiler may generate softcore processor code for non-computationally intensive operations (e.g., administrative operations, I/O operations, etc.) to be executed on processor core(s) 104, and may generate HDL code for computationally intensive operations. A logic block may be instantiated on the processing device 102 as specified by the HDL code for the computationally intensive operations. The logic block may include the asynchronous execution unit(s) 130 and/or the asynchronous logic 136 of one or more of the asynchronous execution units 130, for example. HDL code for the softcore processor implementation may be generated, and a new instruction associated with the logic block that performs the computationally intensive operations may be added to the HDL code for the softcore processor implementation to enable the softcore processor code running on the softcore processor implementation to connect to the logic block to use the new instruction. Further, the compiler may dynamically (e.g., on the fly) generate and add one or more instructions to the softcore processor code (e.g., softcore processor assembler code and/or softcore processor object code) to enable interacting with the logic block generated in view of the generated HDL code. The instructions may be application-specific instructions that define one or more semantics for calling the computationally intensive operations implemented by the logic block. In some embodiments, the compiler may add an operation, information, metadata, and/or reference in the HDL code for the softcore processor(s) 104, which may allow the instructions to be used in the softcore processor code.

The softcore assembler may be implemented in computer instructions stored the memory 150 and executed by the host processor 160, or a host processor of another computing device (not shown). The assembler may receive assembly language code (e.g., softcore processor code or softcore processor assembler code) included in a portion of source code of a computer application that is identified for acceleration from the compiler. The assembly language code may include one or more non-computationally intensive operations (e.g., administrative and/or I/O operations) or operations that may not be translated to HDL code for various other reasons. The softcore assembler may compile the assembly language code into binary code (e.g., softcore processor object code) executable by the processor core(s) 104. The softcore processor object code may be stored in the memory 150. In particular embodiments, the softcore assembler may compile a portion of the assembly language code into the HDL code. In particular embodiments, the HDL code is generated by the compiler.

The HDL compiler may be implemented in computer instructions stored in the memory 150 and executed by the host processor 160 or a host processor of another computing device (not shown). The HDL compiler may receive the HDL code for one or more computationally intensive operations included in a portion of source code of the computer application that is identified for acceleration from the compiler and/or the softcore assembler. The HDL compiler may compile the HDL code into a representation of hardware logic (e.g., bitstream) executable by the processor core(s) 104. If the HDL compiler is executed by a host processor of another computing device, the representation of hardware logic may be transmitted to the computing device 100 from the other computing device (not shown). The representation of the hardware logic may cause one or more of the softcore processor core(s) 104 to be instantiated. In particular embodiments, the representation of the hardware logic, generated by the host processor 160 on the computing device 100, or when transmitted to the computing device 100 from another computing device, may implement a circuit that instantiates various logic blocks included in the asynchronous execution unit 130A to perform the specialized computationally intensive operation associated with the computer application. The instantiated softcore processor(s) 104 may execute the softcore processor object code that includes the instructions to interact with the logic blocks of the asynchronous execution unit 130A.

For the portions of the source code to be compiled for execution by the processor core(s) 104, the compiler may generate host object code. The host object code may include an operation call to an OS kernel driver to enable communication with the program running on the softcore processor core(s) 104.

The host object code, the softcore processor object code, and the representation of the hardware logic (e.g., bitstream) may be packaged into a binary for the computer application and provided to the OS kernel. In particular embodiments, the host object code, the softcore processor object code, and the representation of the hardware logic may not be packaged together and may be stored separately. The OS kernel may extract the host object code, the softcore processor object code, and the representation of the hardware logic (e.g., bitstream) from the package. The OS kernel may cause the softcore processor(s) 104 and the logic block(s) of the asynchronous execution unit(s) 130 to be instantiated according to the representation of hardware logic. If generated by another computer system, the softcore object code may be independently transmitted or transmitted at the same time from another computing device as the representation of the hardware logic to the computer system 100. The OS kernel may instruct the softcore processor(s) 104 to execute the softcore processor object code including the instructions to interact with the logic blocks including the operation(s) of the asynchronous execution unit(s) 130.

When the softcore processor core(s) 104 are instantiated and running the softcore processor object code, and the logic blocks of the asynchronous execution unit(s) 130 are programmed with the representation of the hardware logic, the host processor 160 or the processor core(s) may initiate execution of the computer application by executing the host object code. When the host processor 160 executes the host object code, the portions that were identified for acceleration may be encountered and the host processor may execute the operation call in the host object code to cause the OS kernel 116 to communicate with the processing device 102 executing the softcore processor object code on the softcore processor(s) 104. Then, when the dynamically generated instruction included in the softcore processor code that enables interaction with the logic blocks of the asynchronous execution unit 130 is encountered by the softcore processor core(s) 104, the instruction may be executed to cause the operation implemented of the HDL code by the logic block to be executed in the asynchronous execution unit(s) 130. The logic block may perform an operation to obtain a result and may return the result to the softcore processor core(s) 104 for further operations and/or for transmission of the result to the host processor 160.

The compiler may generate host object code for the portion of the source code that is to be executed by the host processor 160. The host object code may be binary code that is executable by a type (e.g., x86) of the host processor 160. The host object code may include operations in the one or more portions of the source code that were not identified for acceleration.

The compiler may generate HDL code for core operations (e.g., computationally intensive specialized operations) of the portion of the source code identified to be transmitted to the processing device 102. The core operations may be related to the performance (e.g., execution time) of the computer application and/or available compute resources (e.g., host processor 160). The HDL code generated may be minimized to the amount of the source code identified for acceleration, thereby improving performance of the compilation process through the HDL compiler and saving compute resources. In some embodiments, the compiler may match the source code to code sequences for which the compiler can generate HDL code and emit references to these appropriate pre-defined HDL code. For example, a library may be used to add the pre-defined HDL code to the compiler-generated HDL code. In some embodiments, the compiler may dynamically generate the HDL code for the portion of the source code identified to be executed by the processor core(s) 104.

Further, the compiler may generate softcore processor code (e.g., softcore processor assembler code) for non-computationally intensive operations of the portion of the source code identified to be transmitted to the processing device 102 to be executed by a softcore processor core 104. The compiler may emit configurations in the softcore processor assembler code for the softcore processors to execute on the processing device 102. In particular embodiments, the compiler generates one or more application-specific instructions to interact with the logic block derived from the HDL code. The instruction may extend an instruction set provided by a CPU architecture (e.g., RISC-V) of the softcore processor. The compiler may define the semantic for calling the specialized operation implemented by the logic block in view of the HDL code. For example, the compiler may emit pseudo-operations that tie them to new instructions. An example pseudo-operation included in the softcore processor assembler code is represented below:

.if asm_supports_feature_XYZ
   .hdl < . . . describe HDL . . . >
   newinstr reg1, reg2
.else
   . . . assembly code to perform equivalent operations without new extended application-specific instruction . . .
.endif As depicted in the example, the semantic defined specifies the new application-specific instruction ("newinstr") includes a list of arguments including two registers ("reg1, reg2") where the logic block derived from HDL code finds parameters to perform one or more operations on and where to deposit the result when the new instruction is executed. It should be understood that specifying arguments and receiving the result from the logic block may take on many other forms and the above example is provided for explanatory purposes. The generated code could perform other provided code sequences if there is not a specialized operation implemented by the HDL code and a new instruction to enable interacting with the HDL code, as depicted by the "else" branch of the pseudo-operation.

The softcore assembler code may include assembly language code that is input into the softcore assembler. The softcore assembler may be configured to recognize pseudo-operations and emit the one or more instructions used to communicate with the logic block. The softcore assembler may assemble the softcore assembler code into softcore processor object code (e.g., binary code) that is to be executed by the softcore processor core(s) 104 of processing device 102. In particular embodiments, the softcore assembler is also capable of identifying the portion of the softcore processor assembler code that includes computationally intensive operations (e.g., core operations that are critical to performance) and generating the HDL code for those portions.

The HDL code may be input into the HDL compiler. In particular embodiments, the HDL compiler may access a softcore processor hardware description library to identify bitstreams that are optionally already compiled for certain HDL code. That is, HDL code may be synthesized and placed and routed (e.g., by generating lookup tables and routing tables) once into a bitstream and then be made available in the softcore processor hardware description library. Thus, if the HDL compiler receives HDL code in the future that has already been compiled into a bitstream, the HDL compiler may obtain the bitstream for the matching HDL code from the softcore processor hardware description library and save compute resources by avoiding recompiling the HDL code.

In some embodiments, the portion of the HDL code related to the softcore processor implementation may be pre-compiled into the bitstream format (e.g., synthesized and placed and routed) and stored in the softcore processor hardware description library. The HDL code related to the pre-compiled softcore processor implementation may be provided by a third-party.

In some embodiments, a first portion of the HDL code may have already been compiled into a bitstream and added to the softcore processor hardware description library, and a second portion of the HDL code may lack a matching bitstream in the softcore processor hardware description library. The HDL compiler may generate a bitstream for the second portion of the HDL code lacking the matching bitstream and link the generated bitstream with the bitstream already included in the softcore processor hardware description library for the first portion to create a final bitstream.

The HDL compiler may output the compiled bitstream. In some embodiments, any combination of the host object code, the softcore processor object code, and/or the bitstream may be packaged into a binary for the computer application associated with the source code. In some embodiments, the host object code, the softcore processor object code, and/or the bitstream may not be packaged and each of them may be separated. The computer application binary may be received by the OS kernel. The OS kernel may separate the host object code, the softcore processor object code, and the bitstream from the computer application binary. The OS kernel may transmit the host object code to the host processor 160. The OS kernel may transmit (e.g., upload and/or download) the softcore processor object code and the bitstream to the processing device 102. The softcore processor object code may reside in the memory 150, and the OS kernel may initialize the processing device 102 by transmitting the bitstream to the processing device 102. Transmitting the bitstream may instantiate the softcore processor 104 and the logic blocks of the asynchronous execution unit(s) 130 to implement the circuit that performs the one or more computationally intensive operations. The OS kernel may instruct the processing device 102 to execute the softcore processor object code on the softcore processor. The OS kernel may instruct the host processor 160 to execute the host object code, which communicates and collaborates with the softcore processor object code on the processing device 102. The softcore processor object code may execute the one or more application-specific instructions to interact with the logic block to perform the specialized operation. The logic block may return a result to the softcore processor 104 executing the softcore processor object code.

Figure 2:
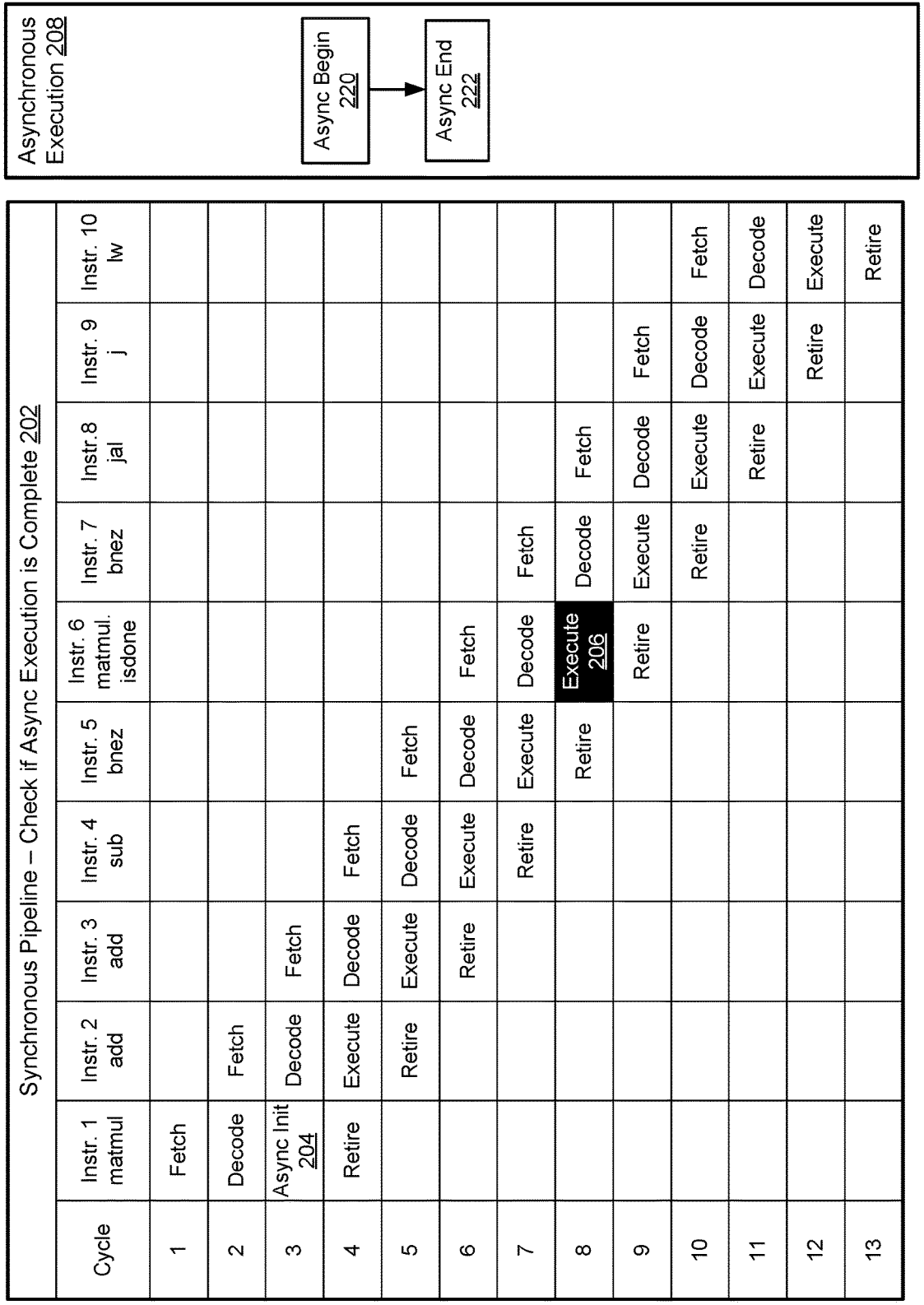
FIG. 2 depicts an example of a synchronous pipeline initiating execution of asynchronous and asynchronous operations, and checking for completion of the asynchronous operations, in accordance with one or more aspects of the present disclosure.

FIG. 2 depicts an example of a synchronous pipeline 202 initiating execution of asynchronous and asynchronous operations, and checking for completion of the asynchronous operations, in accordance with one or more aspects of the present disclosure. Each row of the pipeline table 202 represents to a clock cycle of the processor clock 106, and each column represents an instruction executed by the pipeline 108.

The instructions in the pipeline table 202 are executed by an example assembly code program that calls a synchronous processor instruction named "matmul" to perform a matrix multiplication operation on two matrices in each iteration of a loop. For example, the "matmul" instruction may be dynamically generated as described with reference to the "newinstr" instruction in the example described above. The matmul instruction specifies a matrix multiplication operation that is performed by asynchronous logic 136 of asynchronous execution unit 130A. Since the processor core 104 executing the matmul instruction does not wait for the asynchronous logic 136 to perform the entire matrix multiplication operation prior to executing the next instruction, the example program also calls an instruction (matmul.isdone) to determine whether the asynchronous matmul operation is complete (e.g., the entire matrix multiplication operation has been performed and the operation's output is ready to retrieve from memory 150). The matmul and/or matmul.isdone instructions can be added to the instruction set of the synchronous processor 104 using the dynamic instruction generation techniques described above with respect to FIG. 1. Alternatively, the matmul and/or matmul.isdone instructions can be included in the instruction set of the synchronous processor 104 using any suitable technique. As an alternative to the matmul-operation-specific matmul.isdone instruction, the synchronous processor 104 can include a "wait for asynchronous completion" processor instruction ("async.isdone") that can determine whether any specified asynchronous operation performed by the asynchronous execution unit is complete. The async.isdone instruction can be called as an alternative to the matmul.wait instruction in the program below. The example program is shown below:

```
loop:
  matmul x1, x2, x10
  add x1, x5
  add x2, x5
  sub x0, 1
  bnez x0, loop
checkifdone:
  matmul.isdone x10
  bnez done
  jal wait
  j checkifdone
done:
  lw x1, 0(x1)
```

The matmul instruction causes the asynchronous execution unit 130A to multiply a matrix located at the address in register x1 by a matrix located at the address in register x2 and stores the result at the address in register x1. Alternatively, the matmul instruction can cause the asynchronous execution unit 130A to store the result at the address in register x10 instead of storing the result at the address in register x1. An operand of the matmul instruction, such as the third operand (x10) in this example, can specify a memory address or other identifying value. A subsequent matmul.isdone instruction can cause the synchronous processor to check whether the matmul operation initiated by a particular matmul instruction has completed by specifying the same memory address or other identifying value as the matmul instruction. The pipeline table 202 shows an example execution of the above ten instructions. In the pipeline table 202, each instruction uses four cycles, which correspond to the fetch, decode, execute, and retire stages of the pipeline 108, except for the matmul instruction, for which the third cycle corresponds to the asynchronous initiation stage 126 that occurs in the execute stage time slot. The pipeline table 202 begins at cycle 1 with instruction 1 (matmul). Instruction 1 uses the fetch, decode, asynchronous initiation, and retire stages in cycles 1-4. The asynchronous initiation stage at cycle 3 is shown in box 204. The asynchronous execution 208 represents the execution of the asynchronous matmul operation. The asynchronous matmul operation initiated by the asynchronous initiation stage begins at block 220 in the asynchronous execution unit 130A at a time that occurs during cycle 3. The asynchronous operation continues in parallel with cycles 3-6 of the pipeline 108 and ends at block 222. Thus, the asynchronous logic 126 of the matmul operation receives input at or after the async begin block 220, and produces its output at or before the async end block 222. The matmul instruction is retired at cycle 4, although the asynchronous matmul operation continues until cycle 6, as stated above.

Instruction 2 (add) uses the fetch, decode, synchronous execute, and retire stages in cycles 2-5. Similarly, each of instructions 3-5 begins in the cycle after the previous instruction began and ends in the cycle after the previous instruction ended. At instruction 6 (matmul.isdone), the program determines whether the matmul operation is complete (e.g., has stored its output in memory). The program performs this determination prior to accessing the output of the matmul operation. The matmul.done instruction produces a result of 1 if the matmul instruction is complete, or a result of 0 if the matmul instruction is not complete. As noted above, the matmul.isdone instruction may have an operand that can be used to correlate the instruction call with a previous matmul instruction call. The correlating operand can be, for example, a results memory address associated with or included as an operand of the previous call to the matmul instruction. In the example program above, register x10 contains a memory address used as the correlating operand in the calls to the matmul and matmul.done instructions.

The matmul.done instruction is executed at cycle 8, as shown by block 206. The matmul.done instruction can determine whether the matmul operation is complete by, for example, determining whether a result has been stored at the results memory address, or a "done" flag at a memory location related to the results memory address has been set to a particular value such as 1. The "done" flag can be set to 0 by the asynchronous execution unit 130A when the operation associated with the results memory address is initiated, and set to 1 by an interrupt handler or other instructions when the results of the operation associated with the results memory address are enqueued in a results queue.

Since the matmul.done instruction is executed at cycle 8, it determines that the matmul operation is done if the matmul operation has completed prior to cycle 8. In the example pipeline 202, the matmul operation completed in cycle 6, as shown by the async end block 222. Thus, in this example, the matmul.done instruction produces a result of 1, indicating that the matmul operation is done and its output can be accessed. Instructions 7 branches to instruction 10 if the result is not zero, and instruction 10 accesses the result (e.g., via the address stored in register x1 or x10). If the matmul operation had continued to execute through cycle 8 instead of ending at cycle 6, then the matmul.done instruction would produce a result of 0, indicating that the matmul operation was not complete and its output was not ready to be accessed. If the matmul.done instruction produces a result of 0, then the program can wait for a period of time and invoke matmul.done again to determine whether the matmul operation is complete.

Figure 3:
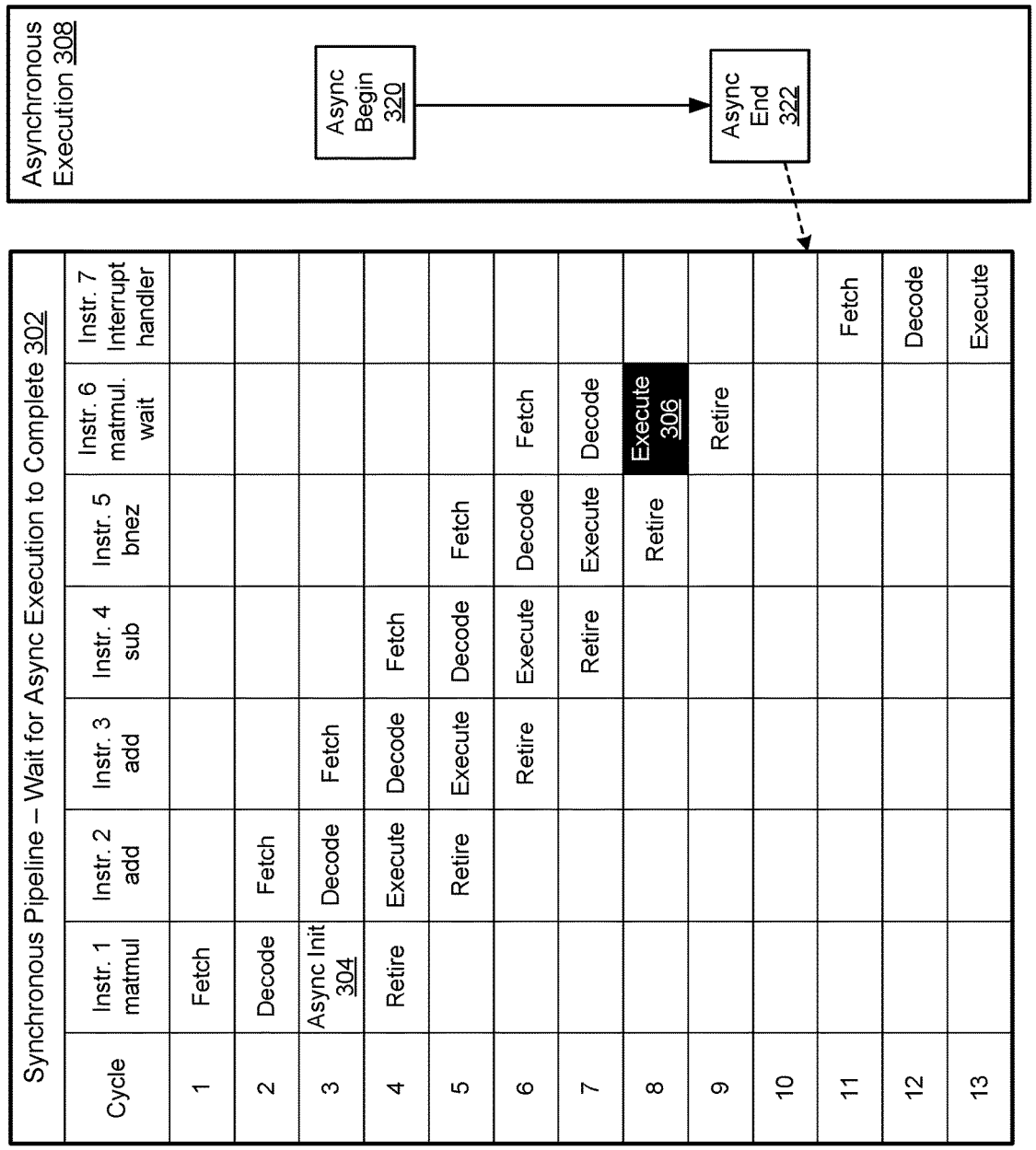
FIG. 3 depicts an example of a synchronous pipeline initiating execution of asynchronous and asynchronous operations, and waiting until completion of the asynchronous operations, in accordance with one or more aspects of the present disclosure.

FIG. 3 depicts an example of a synchronous pipeline initiating execution of asynchronous and asynchronous operations, and waiting until completion of the asynchronous operation, in accordance with one or more aspects of the present disclosure. FIG. 3 is similar to FIG. 2, but illustrates a matmul.wait instruction that can wait for the asynchronous operation to complete, instead of the matmul.done operation that checks if the asynchronous operation is complete. The instructions in the pipeline table 302 are executed by an example assembly code program that calls an instruction named "matmul" to perform a matrix multiplication operation on two matrices in each iteration of a loop, as described above with respect to FIG. 2. Since the processor core 104 executing the matmul instruction does not wait for the asynchronous logic 136 to perform the entire matrix multiplication operation, the example program also calls an instruction named matmul.wait to wait until the asynchronous matmul operation is complete (e.g., the entire matrix multiplication operation has been performed and the operation's output is ready to retrieve from memory 150). The matmul and matnul.wait instruction may be dynamically-generated and included in the instruction set of the synchronous processor 104 as described above with respect to FIG. 1. As an alternative to the matmul-operation-specific matmul.wait instruction, the synchronous processor 104 can include a "wait for asynchronous completion" processor instruction ("async.wait") that can wait for completion of any specified asynchronous operation being performed by the asynchronous execution unit. The asyncwait instruction can be called as an alternative to the matmul.wait instruction in the program below. The example program is shown below:

loop:
matmul x1, x2, x10
add x1, x5
add x2, x5
sub x0, 1
bnez x0, loop
matmul.wait x10
lw x1, 0(x1)

The matmul.wait instruction can wait until the matmul operation initiated by the matmul instruction above has completed. An operand of the matmul instruction, such as the third operand (x10) in this example, can specify a memory address or other identifying value. A subsequent matmul.wait operation can wait for the matmul operation initiated by a particular matmul instruction by specifying the same memory address or other identifying value as the matmul instruction. Thus, the next instruction after the matmul.wait instruction can access the output of the matmul instruction.

The pipeline table 302 begins similarly to the pipeline table 202, with the matmul instruction being fetched at cycle 1. The asynchronous initiation stage of the matmul instruction at cycle 3 is shown in box 304. The asynchronous execution 308 represents the execution of the asynchronous matmul operation. The asynchronous matmul operation initiated by the asynchronous initiation stage begins at block 320 in the asynchronous execution unit 130A at a time that occurs during cycle 3. The asynchronous operation continues in parallel with cycles 3-10 of the pipeline 108 and ends at block 322. Thus, the asynchronous logic 126 of the matmul operation receives input at or after the async begin block 320, and produces its output at or before the async end block 322. The matmul instruction is retired at cycle 4, although the asynchronous matmul operation continues until cycle 10, as stated above. Instructions 2-5 are similar to instructions 2-5 of FIG. 2.

At instruction 6 (matmul.wait), the program waits until the matmul operation is complete (e.g., has stored its output in memory). The program performs this wait prior to accessing the output of the matmul operation. The matmul.wait instruction produces a result of 1 if the matmul instruction is complete, or a result of 0 if the matmul instruction is not complete. However, the matmul.wait instruction does not ordinarily stop waiting until the correlated operation has completed. The matmul.wait instruction may have an operand that can be used to correlate the instruction call with a previous matmul instruction call, as described above with respect to FIG. 2.

The matmul.wait instruction is executed at cycle 8, as shown by block 306. The matmul.wait instruction can wait for the matmul operation to complete by, for example, waiting for result data to be stored in a queue or mailbox associated with the results memory address. The result data can be stored in the queue or mailbox by the "store/enqueue async output" component 138 or the "notify synchronous processor" 140 component, as described with respect to FIG. 1.

Since the matmul.wait instruction is executed at cycle 8, but the matmul operation is still executing at cycle 8 (as shown by the asynchronous execution 308), the matmul.wait instruction does not allow the subsequent instruction in the program to execute. The matmul operation completes execution at block 322, which occurs in cycle 10. When the matmul operation completes, the "store/enqueue async output" component 138 can stores information in the memory 150 or a register indicating that the operation is complete, and the "notify synchronous processor" component 140 can send a notification, e.g., via a mailbox to the synchronous processor core 104 indicating that the matmul operation is complete. Alternatively or additionally, the component 138 can enqueue an indication that the matmul operation is complete in a queue or mailbox. The indication can include a reference to the address of the results of the matmul operation. Enqueuing the indication in the queue or mailbox can cause instructions to be executed on the synchronous processor core 104 which cause the matmul.wait instruction to stop waiting and allow the next instruction in the program to execute. Thus, in response to completion of the matmul operation, the async end bloc 322 can send a notification via a queue, mailbox, interrupt, or processor-specific synchronization mechanism to the synchronous processor core 104. The notification is received by the processor core 104 at cycle 10 in the example pipeline table 302. As a result of the notification, the processor core 104 executes an interrupt handler (instruction 7). The interrupt handler's first instruction is fetched at cycle 11, decoded at cycle 12, and executed at cycle 13. The interrupt handler can cause the matmul.wait operation to stop waiting and allow the next instruction in the program to execute.

Figure 4:
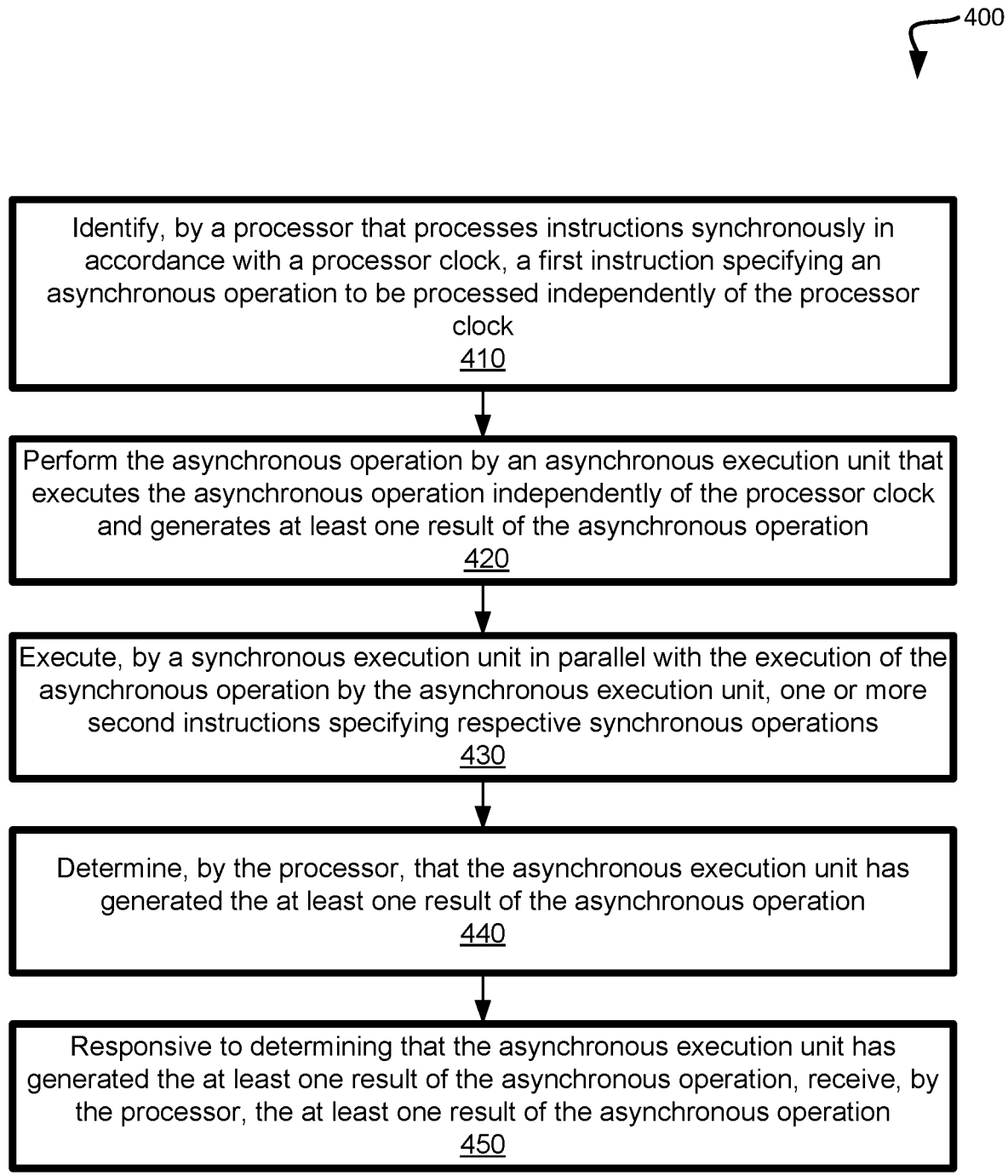

FIG. 4 depicts a flow diagram of an example method 400 for performing asynchronous operations on an asynchronous execution unit in parallel with synchronous operations performed on a synchronous execution unit, in accordance with one or more aspects of the present disclosure.

Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a processing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a processing device may identify, by a processor that processes instructions synchronously in accordance with a processor clock, a first instruction specifying an asynchronous operation to be processed independently of the processor clock.

At block 420, the processing device may perform the asynchronous operation by an asynchronous execution unit that executes the asynchronous operation independently of the processor clock and generates at least one result of the asynchronous operation. At block 430, the processing device may execute, by a synchronous execution unit in parallel with the execution of the asynchronous operation by the asynchronous execution unit, one or more second instructions specifying respective synchronous operations At block 440, the processing device may determine, by the processor, that the asynchronous execution unit has generated the at least one result of the asynchronous operation. At block 450, the processing device may, responsive to determining that the asynchronous execution unit has generated the at least one result of the asynchronous operation, receive, by the processor, the at least one result of the asynchronous operation. Responsive to completing the operations described herein above with references to block 450, the method may terminate.

FIG. 5 depicts a flow diagram of an example method 500 for performing asynchronous operations on an asynchronous execution unit in parallel with synchronous operations performed on a synchronous execution unit, in accordance with one or more aspects of the present disclosure.

Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a processing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a processing device may identify, by a processor that processes instructions synchronously in accordance with a processor clock, a first instruction specifying an asynchronous operation to be processed independently of the processor clock. At block 520, the processing device may identify, by an asynchronous execution unit that receives the asynchronous operation, an address of a result memory location, wherein the address corresponds to an operand of the asynchronous operation. At block 530, the processing device may perform the asynchronous operation by the asynchronous execution unit that executes the asynchronous operation independently of the processor clock and generates at least one result of the asynchronous operation.

At block 540, the processing device may enqueue, by the asynchronous execution unit, a queue entry containing the address of the result memory location in a result queue, and notify the processor that a result has been added to the result queue. At block 550, the processing device may, responsive to the notification that the result has been added to the result queue, dequeue the queue entry and provide the address of the result memory location to an interrupt handler associated with the instruction. Responsive to completing the operations described herein above with references to block 550, the method may terminate.

Figure 6:
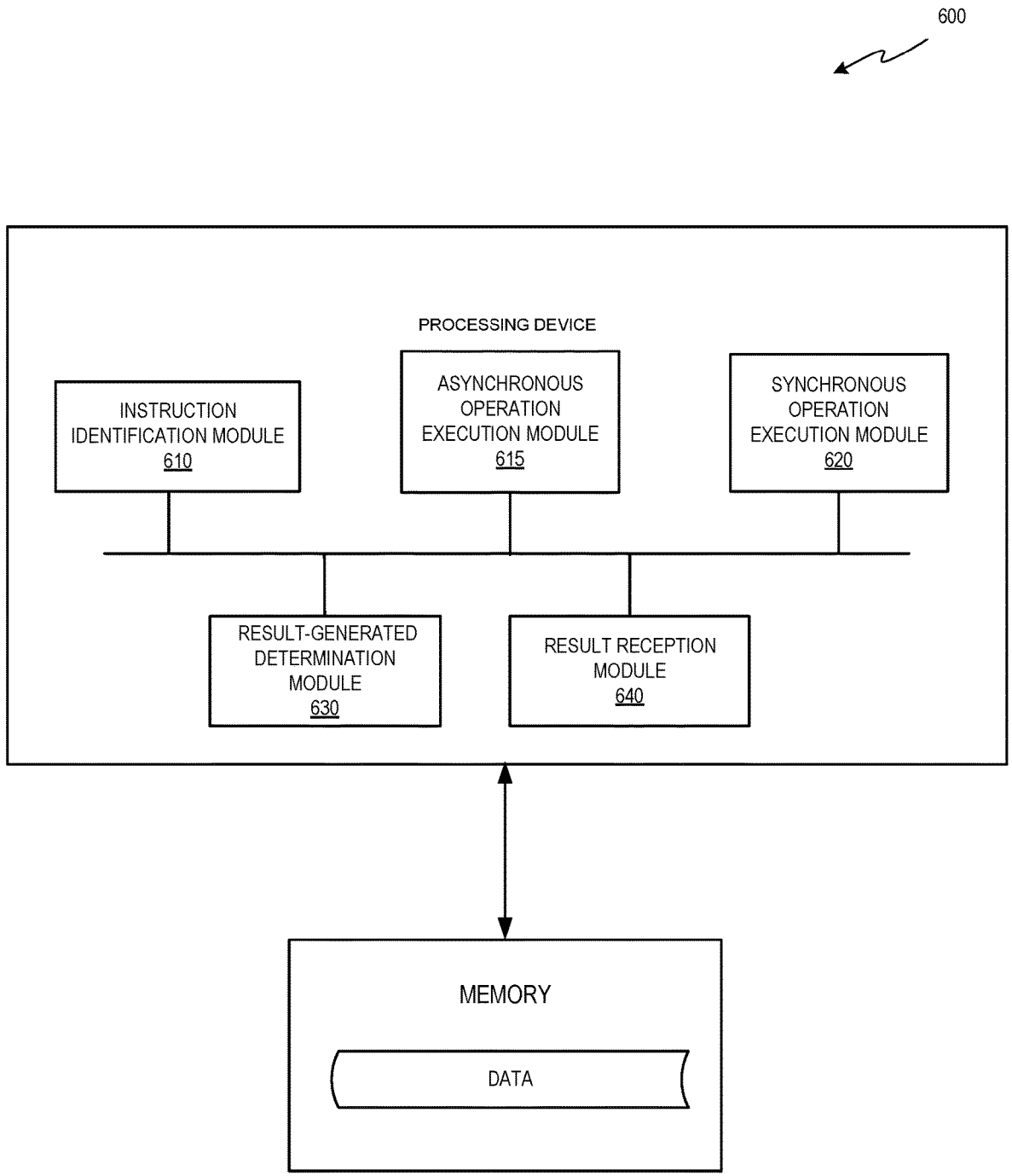
FIG. 6 depicts a block diagram of a computer system operating in accordance with one or more aspects of the present disclosure.

FIG. 6 depicts a block diagram of a computer system 600 operating in accordance with one or more aspects of the present disclosure. Computer system 600 may be the same or similar to computing device 100 of FIG. 1, and may include one or more processors and one or more memory devices. Each processor of the computer system 600 may be the same or similar to processing device 102 of FIG. 1. The memory devices of the computer system 600 may be the same or similar to the memory 150 of FIG. 1. In the example shown, computer system 600 may include an instruction identification module 610, an asynchronous operation execution module 615, a synchronous operation execution module 620, a result-generated determination module 630, and a result reception module 640.

Instruction identification module 610 may enable a processor that processes instructions synchronously in accordance with a processor clock to identify a first instruction specifying an asynchronous operation to be processed independently of the processor clock.

Asynchronous operation execution module 615 may enable an asynchronous execution unit of the processor to perform the asynchronous operation. The asynchronous execution unit may execute the asynchronous operation independently of the processor clock and generate at least one result of the asynchronous operation.

Synchronous operation execution module 620 may enable a synchronous execution unit of the processor to execute, in parallel with the execution of the asynchronous operation by the asynchronous execution unit, one or more second instructions specifying respective synchronous operations Result-generated determination module 630 may cause the processor to determine that the asynchronous execution unit has generated the at least one result of the asynchronous operation. In particular embodiments, to determine that the asynchronous execution unit has generated the at least one result, the processor may receive a result notification generated by the asynchronous execution unit. The asynchronous execution unit may generate the result notification responsive to completing the asynchronous operation. To receive a result notification, the processor may detect that a flag or register of the processor is set, detect an interrupt, detect a processor-specific synchronization operation, or detect modification of in-memory data. In other embodiments, to determine that the asynchronous execution unit has generated the at least one result, the synchronous execution unit may execute a third instruction that determines whether the asynchronous execution unit has generated the at least one result of the asynchronous operation.

Result-generated determination module 630 may cause the processor to determine that the asynchronous execution unit has generated the at least one result of the asynchronous operation. In the example shown, computer system 600 may include an expected execution time determination module (not shown), which may determine an expected execution time of the asynchronous operation. To determine that the asynchronous execution unit has generated the at least one result of the asynchronous operation, the processor may determine that the expected execution time has elapsed since the asynchronous execution unit began performing the asynchronous operation. The expected execution time may be a number of clock cycles of the synchronous processor core's processor clock.

Result reception module 640 may enable the processor to, responsive to determining that the asynchronous execution unit has generated the at least one result of the asynchronous operation, receive the at least one result of the asynchronous operation.

Figure 7:
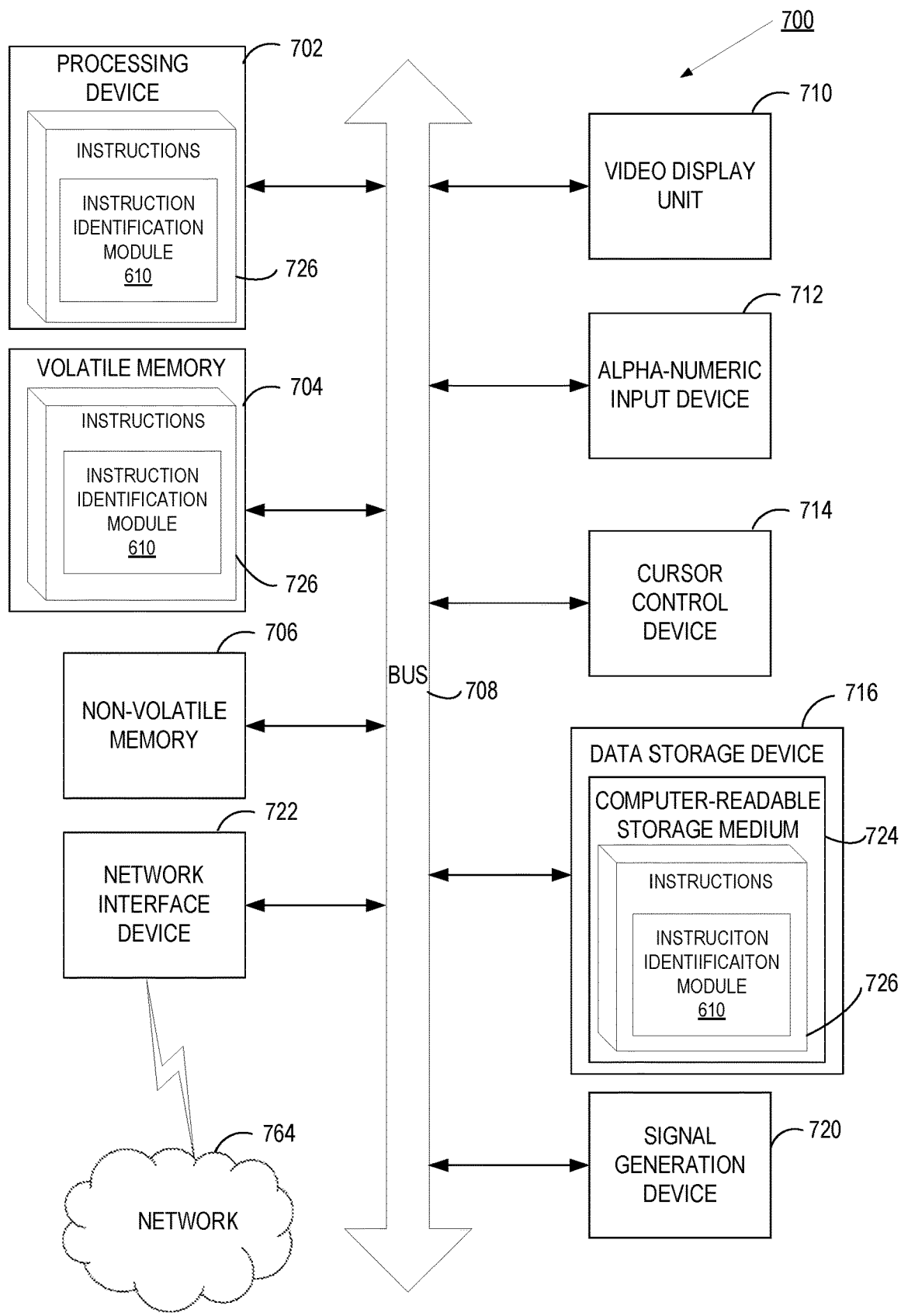
FIG. 7 depicts a block diagram of an example computer system operating in accordance with one or more aspects of the present disclosure.

FIG. 7 depicts a block diagram of a computer system operating in accordance with one or more aspects of the present disclosure. In various illustrative examples, computer system 700 may correspond to computing device 100 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 400, or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying, by a processor that processes instructions synchronously in accordance with a processor clock, a first instruction specifying an asynchronous operation to be processed independently of the processor clock, wherein the first instruction comprises: an operation code that identifies one or more operations of an asynchronous execution unit, and one or more operands;
    performing the asynchronous operation by the asynchronous execution unit that executes the asynchronous operation independently of the processor clock and generates at least one result of the asynchronous operation;
    executing, by a synchronous execution unit in parallel with the execution of the asynchronous operation by the asynchronous execution unit, one or more second instructions specifying respective synchronous operations;
    determining, by the processor, that the asynchronous execution unit has generated the at least one result of the asynchronous operation; and
    responsive to determining that the asynchronous execution unit has generated the at least one result of the asynchronous operation, receiving, by the processor, the at least one result of the asynchronous operation.

2. The method of claim 1, wherein determining that the asynchronous execution unit has generated the at least one result of the asynchronous operation comprises:
    receiving, by the processor, a result notification generated by the asynchronous execution unit.

3. The method of claim 2, wherein the asynchronous execution unit generates the result notification responsive to completing the asynchronous operation.

4. The method of claim 2, wherein receiving the result notification comprises one or more of:
    detecting that a flag or register of the processor is set,
    detecting an interrupt,
    detecting a processor-specific synchronization operation, or
    detecting modification of in-memory data.

5. The method of claim 1, wherein determining that the asynchronous execution unit has generated the at least one result comprises:
    executing, by the synchronous execution unit, a third instruction that determines whether the asynchronous execution unit has generated the at least one result of the asynchronous operation.

6. The method of claim 1, further comprising:
    determining an expected execution time of the asynchronous operation,
    wherein determining that the asynchronous execution unit has generated the at least one result of the asynchronous operation comprises determining that the expected execution time has elapsed since the asynchronous execution unit began performing the asynchronous operation.

7. The method of claim 6, wherein the expected execution time comprises a number of clock cycles of the processor clock.

8. The method of claim 1, further comprising:
providing the asynchronous operation to the asynchronous execution unit, wherein providing the asynchronous operation to the asynchronous execution unit comprises adding the asynchronous operation to an operation queue associated with the asynchronous execution unit.

9. The method of claim 8, wherein the asynchronous execution unit de-queues the asynchronous operation from the operation queue prior to performing the asynchronous operation.

10. The method of claim 1, wherein the asynchronous operation specifies a result memory location, and the asynchronous execution unit stores the at least one result at the result memory location.

11. The method of claim 10, further comprising storing, by the processor, the at least one result of the asynchronous operation in the result memory location.

12. The method of claim 10, wherein receiving the at least one result of the asynchronous operation comprises retrieving the at least one result from the result memory location.

13. The method of claim 1, wherein the processor comprises one or more pipeline stages including a first stage and a second stage, and the processor performs the first stage on the one or more second instructions using the synchronous execution unit in parallel with the execution of the asynchronous operation by the asynchronous execution unit.

14. The method of claim 13, wherein the processor performs the first stage on the one or more second instructions using the synchronous execution unit in parallel with performing the second stage on the first instruction.

15. A system comprising:
a memory; and
a processing device operatively coupled to the memory, wherein the processing device processes instructions synchronously in accordance with a processor clock, the processing device to:
  identify a first instruction specifying an asynchronous operation to be processed independently of the processor clock;
  perform the asynchronous operation by an asynchronous execution unit that executes the asynchronous operation independently of the processor clock and generates at least one result of the asynchronous operation;
  execute, by a synchronous execution unit in parallel with the execution of the asynchronous operation by the asynchronous execution unit, one or more second instructions specifying respective synchronous operations, wherein the one or more second instructions comprise:
    an operation code that identifies one or more operations of the synchronous execution unit, and
    one or more operands;
  determine that the asynchronous execution unit has generated the at least one result of the asynchronous operation; and
  responsive to determining that the asynchronous execution unit has generated the at least one result of the asynchronous operation, receive the at least one result of the asynchronous operation.

16. The system of claim 15, wherein to determine that the asynchronous execution unit has generated the at least one result of the asynchronous operation the processing device is further to:
receive a result notification generated by the asynchronous execution unit.

17. A non-transitory computer-readable medium storing instructions that, when executed by a processing device, cause the processing device to:
identify a first instruction specifying an asynchronous operation to be processed independently of a processor clock, wherein the processing device processes instructions synchronously in accordance with the processor clock,
perform the asynchronous operation by an asynchronous execution unit that executes the asynchronous operation independently of the processor clock and generates at least one result of the asynchronous operation, wherein the asynchronous operation specifies a result memory location, and the asynchronous execution unit further stores the at least one result at the result memory location;
execute, by a synchronous execution unit in parallel with the execution of the asynchronous operation by the asynchronous execution unit, one or more second instructions specifying respective synchronous operations;
determine that the asynchronous execution unit has generated the at least one result of the asynchronous operation; and
responsive to determining that the asynchronous execution unit has generated the at least one result of the asynchronous operation, receive the at least one result of the asynchronous operation.

18. The non-transitory computer-readable medium of claim 17, wherein to determine that the asynchronous execution unit has generated the at least one result of the asynchronous operation, the processing device is further to:
receive a result notification generated by the asynchronous execution unit.

* * * * *